United States Patent
Al Ramadan et al.

(10) Patent No.: US 12,360,033 B2
(45) Date of Patent: Jul. 15, 2025

(54) TESTING PRESSURE VESSEL FOR CURED CONCRETE PIPE SHEATH

(71) Applicant: KING FAHD UNIVERSITY OF PETROLEUM AND MINERALS, Dhahran (SA)

(72) Inventors: Mustafa A. Al Ramadan, Dhahran (SA); Xianmin Zhou, Dhahran (SA); Salaheldin Elkatatny, Dhahran (SA); Murtada S. Aljawad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 446 days.

(21) Appl. No.: 18/077,770

(22) Filed: Dec. 8, 2022

(65) Prior Publication Data
US 2024/0192113 A1 Jun. 13, 2024

(51) Int. Cl.
*G01N 15/08* (2006.01)
(52) U.S. Cl.
CPC ..... *G01N 15/0806* (2013.01); *G01N 15/0826* (2013.01)
(58) Field of Classification Search
CPC .......... G01N 33/383; G01N 3/12; G01N 3/10; G01N 3/08; G01N 3/24; G01N 2203/19; G01N 15/082; G01N 11/08; G01N 15/0806; G01N 15/0826; G01N 29/024; E21B 47/005; E21B 33/13; E21B 36/001; E21B 33/12; B65G 5/00; B01F 23/235;

(Continued)

(56) References Cited

U.S. PATENT DOCUMENTS

| 8,726,993 B2 | 5/2014 | Cooke, Jr. et al. |
| 9,038,450 B2 | 5/2015 | Pindiprolu et al. |

(Continued)

FOREIGN PATENT DOCUMENTS

WO  WO-2007020435 A1 * 2/2007 ........... G01N 33/383

OTHER PUBLICATIONS

Serafin Garcia Fernandez, et al., "Characterization of wellbore microannuli", Journal of Natural Gas Science and Engineering, vol. 62, 2019, pp. 13-25.

(Continued)

*Primary Examiner* — Brandi N Hopkins
(74) *Attorney, Agent, or Firm* — Oblon, McClelland, Maier & Neustadt, L.L.P.

(57) ABSTRACT

A testing pressure vessel for permeability testing of a cured concrete sample. The testing pressure vessel includes a cylindrical pressure vessel with a sample injection port and a casing fluid injection port, and a casing fluid outlet port and an outlet port. The testing pressure vessel also includes a hydraulic inlet, and a sleeve positioned adjacent to an inner surface of the cylindrical pressure vessel and the hydraulic inlet. The testing pressure vessel further includes a plurality of pressure ports to measure a pressure exerted on the sleeve. The testing involves applying confining pressure and injection pressure to the cured concrete sample, to have the confining pressure to at least 300 psi higher than the injection pressure until a predetermined injection pressure is achieved. The testing further includes measuring the permeability of the cured concrete sample directly by measuring the pressure exerted on the sleeve.

20 Claims, 9 Drawing Sheets

(58) Field of Classification Search
CPC ......... F17C 1/007; C09K 8/426; C09K 8/467; C09K 8/12; C04B 28/02
See application file for complete search history.

(56) References Cited

U.S. PATENT DOCUMENTS

| | | |
|---|---|---|
| 9,594,009 B2 | 3/2017 | Meadows et al. |
| 11,378,568 B1 | 7/2022 | Bi |
| 2009/0084189 A1* | 4/2009 | McMechan .............. G01N 3/12 73/803 |
| 2014/0326073 A1* | 11/2014 | Meadows ................ G01N 3/08 73/796 |

OTHER PUBLICATIONS

Zhang, et al.; A Novel Approach to Investigate Cement Pore Pressure during Hardening; American Association of Drilling Engineers; Apr. 2019; 7 Pages.

\* cited by examiner

TESTING PRESSURE VESSEL FOR CURED CONCRETE PIPE SHEATH

BACKGROUND

Technical Field

The present disclosure is directed to a testing pressure vessel for permeability testing of a concrete pipe sheath made from a cured cement slurry, e.g., to be used in oil or gas wells under varied temperature and pressure conditions. The present disclosure is also directed to a method to evaluate sealability of cured concrete pipe sheathes by testing the cured concrete pipe sheathes using the testing pressure vessel.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cement compositions are commonly utilized in primary cementing operations whereby pipe strings, such as casings and liners, are cemented in well bores. The cement compositions utilized in primary cementing may often be lightweight to prevent excessive hydrostatic pressures from being exerted on formations penetrated by well bores. When performing primary cementing, the cement composition is pumped into an annular space between the walls of the well bore and the exterior surface of the string disposed therein. The cement composition is permitted to set in the annular space, thereby forming an annular sheath of hardened, impermeable cement therein. The cement sheath physically supports and positions the pipe in the well bore and bonds to exterior surfaces of the pipe to the walls of the well bore, whereby the undesirable migration of fluids between zones or formations penetrated by the well bore is prevented.

The formed cement sheath functions to restrict fluid movement between the formation and the open hole, and to bond and support the casing. Gas migration is the invasion of formation fluids (gas in this case) into the annular space due to a pressure imbalance at the formation, where the fluids (gas) may migrate to a lower pressure zone or possibly to the surface. Such gas migration through the cement sheath and into the wellbore from a gas bearing formation has the potential to cause significant problems for well operators. Therefore, it is imperative to evaluate the properties of permeability/sealability of the cement sheath to determine how these properties are affected by different cement compositions.

Different cement compositions are designed for a variety of well bore conditions, which may be above ambient temperature and pressure. When designing a cement composition, several potential mixtures may need to be evaluated to determine their mechanical properties under varying conditions of the oil well. Additionally, it may be required to evaluate secondary gas migration through annular cement and cement flaws. It may not be possible to perform such testing in the field, due to practical reasons.

Conventionally to test properties of the cement sheath in laboratory conditions, it has been necessary to prepare a multiplicity of samples of the cement sheath in small test cylinders, or cubes, and to then test a series of such samples as a function of time, while the cement sheath is exposed to elevated temperatures and pressures present in the wellbore environment. In testing batches of cement sheath in this manner, it has been necessary to remove the cement sheath samples from the elevated temperature and pressure environment to perform tests. Thus, the actual testing of cement samples has usually been performed at room temperature and at atmospheric pressure, rather than at the elevated temperature and elevated pressure present in a well borehole environment.

U.S. Pat. No. 9,038,450B2 provides an apparatus and method for testing cement-formation bonding under wellbore pressure conditions. The apparatus comprises a pressure chamber containing a core of formation material. The cement material to be tested is allowed to set or bond to one side of the core while formation fluids under wellbore pressure conditions are present on the other side. Leakage of formation fluids is measured to evaluate the quality of the interface between the cement and formation materials.

U.S. Pat. No. 9,594,009B2 provides devices and methods for testing cement which includes a pressure vessel with a sample container inside an interior working volume of the pressure vessel. Further, the pressure vessel is configured to supply a first pressurized fluid to control a pore pressure of a cement sample and to supply a second pressurized fluid to lateral exterior surfaces of the sample container to provide a confining pressure that can be different than the pore pressure.

U.S. patent Ser. No. 11/378,568B1 provides a method and experimental apparatus for studying properties of cement slurries to be used in an oil or gas well under varied pressure and temperature conditions. The apparatus can be used to predict the likelihood of gas migration, compressive strength, and static gel strength of the cement slurry. The device includes a servo motor and coupling magnets to drive a paddle at a very slow speed through the cement in a pressure vessel, a pair of acoustic transducers to generate an acoustic signal and measure the transit time of the acoustic signal after it transits the cement, and a gas injection system to predict the severity of gas migration in cement.

Each of the aforementioned references describes an experimental method or apparatus that suffers from one or more drawbacks hindering their adoption. None of the references provide a testing pressure vessel with a sample injection port and a casing fluid injection port, as well as a hydraulic inlet, to mimic the secondary gas migration through the cement sheath and further to investigate the effect of pressure cycling (ballooning) on the cement sheath. Accordingly, it is one object of the present disclosure to provide a testing pressure vessel that may evaluate sealability of cement sheath and permits the testing of parameters such as leakage time, cement permeability, and micro-annulus permeability of the cement sheath.

SUMMARY

In an exemplary embodiment, a testing apparatus for permeability testing of a cured concrete sample is provided. The testing apparatus includes a cylindrical pressure vessel having a top cap and a bottom cap. The bottom cap has a first mating surface configured to contact a ring-shaped surface of a bottom face of the cylindrical pressure vessel and accommodate an O-ring to seal the bottom cap to the bottom face of the cylindrical pressure vessel. The top cap has a second mating surface configured to contact a ring-shaped surface of a top face of the cylindrical pressure vessel and accommodate an O-ring to seal the top cap to the top face of the cylindrical pressure vessel. The top cap has a sample injection port passing from an outer surface of the top cap to an inner surface of the top cap and a casing fluid injection port passing from the outer surface of the top cap to the inner surface of the top cap. The casing fluid injection port is axially aligned with the cylindrical pressure vessel. The sample injection port is offset from axial alignment with the cylindrical pressure vessel to fluidly connect the sample injection port at an upper annular space within an enclosed space of the cylindrical pressure vessel. The bottom cap has a casing fluid outlet port passing from an inner surface of the bottom cap to an outer surface of the bottom cap and an outlet port passing from the outer surface of the bottom cap to the inner surface of the bottom cap. The top cap has a top cylindrical protrusion having a diameter less than a diameter of the top cap and configured to inset into the enclosed space of the cylindrical pressure vessel forming the upper annular space between an outer cylindrical surface of the top cylindrical protrusion and an inner surface of the cylindrical pressure vessel. The bottom cap has a bottom cylindrical protrusion having a diameter less than a diameter of the bottom cap and configured to inset into the enclosed space of the cylindrical pressure vessel forming a lower annular space between an outer cylindrical surface of the bottom cylindrical protrusion and the inner surface of the cylindrical pressure vessel. The testing pressure vessel also includes a hydraulic inlet passing from an outer surface of the cylindrical pressure vessel to an outer surface of a sleeve, wherein the sleeve is positioned adjacent to the inner surface of the cylindrical pressure vessel and the hydraulic inlet. The testing pressure vessel further includes a plurality of pressure ports mounted proximal to the sleeve to measure a pressure exerted on the sleeve.

In one or more exemplary embodiments, the top cap has a porous frit configured to allow uniform distribution of each of an injected casing fluid passing through the casing fluid injection port and a sample injection fluid passing through the sample injection port to the cylindrical pressure vessel.

In one or more exemplary embodiments, the bottom cap has a porous frit configured to allow uniform distribution of each of an injected casing fluid passing through the casing fluid injection port and a sample injection fluid passing through the sample injection port to the cylindrical pressure vessel.

In one or more exemplary embodiments, the outlet port further comprises a back-pressure regulator (BPR) positioned between an inner surface of the bottom cap and the outer surface of the bottom cap.

In one or more exemplary embodiments, the sleeve is fabricated of rubber.

In one or more exemplary embodiments, the hydraulic inlet further comprises a syringe.

In one or more exemplary embodiments, a sample injection fluid passing through the sample injection port is collected with a container positioned by the outlet port at the outer surface of the bottom cap.

In one or more exemplary embodiments, the sample injection port is configured to accommodate a flow of a sample injection fluid in a range from 0.00025 to 80 cubic centimeters per minute (cc/min).

In one or more exemplary embodiments, the syringe accommodates a confining pressure of from 5000 pounds per square inch (psi) to 6000 psi.

In one or more exemplary embodiments, the plurality of pressure ports is at least 3.

In one or more exemplary embodiments, an individual pressure port of the plurality of pressure ports is separated from a neighboring pressure port by a distance of from 15-30% of a total length of the cylindrical pressure vessel.

In another exemplary embodiment, a method for evaluating a sealability of the cured concrete sample with the testing pressure vessel is provided. The method includes preparing a cement slurry with cement and a vibrator within a mold, wherein the vibrator is configured to purge entrapped air inside the cement slurry. The method further includes curing the cement slurry to form the cured concrete sample. The method further includes evaluating the sealability of the cured concrete sample under different compressive flange loads in the testing apparatus.

In one or more exemplary embodiments, a microfilm is placed on an outer surface of an inner pipe of the mold at a predetermined thickness to define a microannulus in the cured concrete sample.

In one or more exemplary embodiments, the cured concrete sample with or without the microannulus is removed from the mold.

In one or more exemplary embodiments, the method further comprises adding cement additives to the cement slurry.

In one or more exemplary embodiments, the cement additives are at least one additive selected from a group consisting of accelerators, retarders, dispersants, extenders, weighting agents, gels, foamers, and fluid loss additives.

In another exemplary embodiment, a method to test cured concrete pipe samples using the testing apparatus is provided. The method includes placing the sleeve around the cured concrete pipe sheath within the cylindrical pressure vessel to apply a confining pressure on the cured concrete sample. The method further includes applying the confining pressure to the cured concrete sample of at least 300 psi and applying an injection pressure to the cured concrete pipe sheath by supplying an inert gas. The method further includes raising the confining pressure to at least 300 psi higher than the injection pressure until a predetermined injection pressure is achieved. The method further includes measuring a permeability of the cured concrete sample directly once the predetermined injection pressure is achieved.

In one or more exemplary embodiments, the method further determining a gas flow rate of an effluent running through the cylindrical pressure vessel with a gas flow meter.

In one or more exemplary embodiments, the inert gas is nitrogen or helium.

In one or more exemplary embodiments, the method further includes mounting pressure transducers to the outer surface of the cylindrical pressure vessel before applying the confining pressure.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
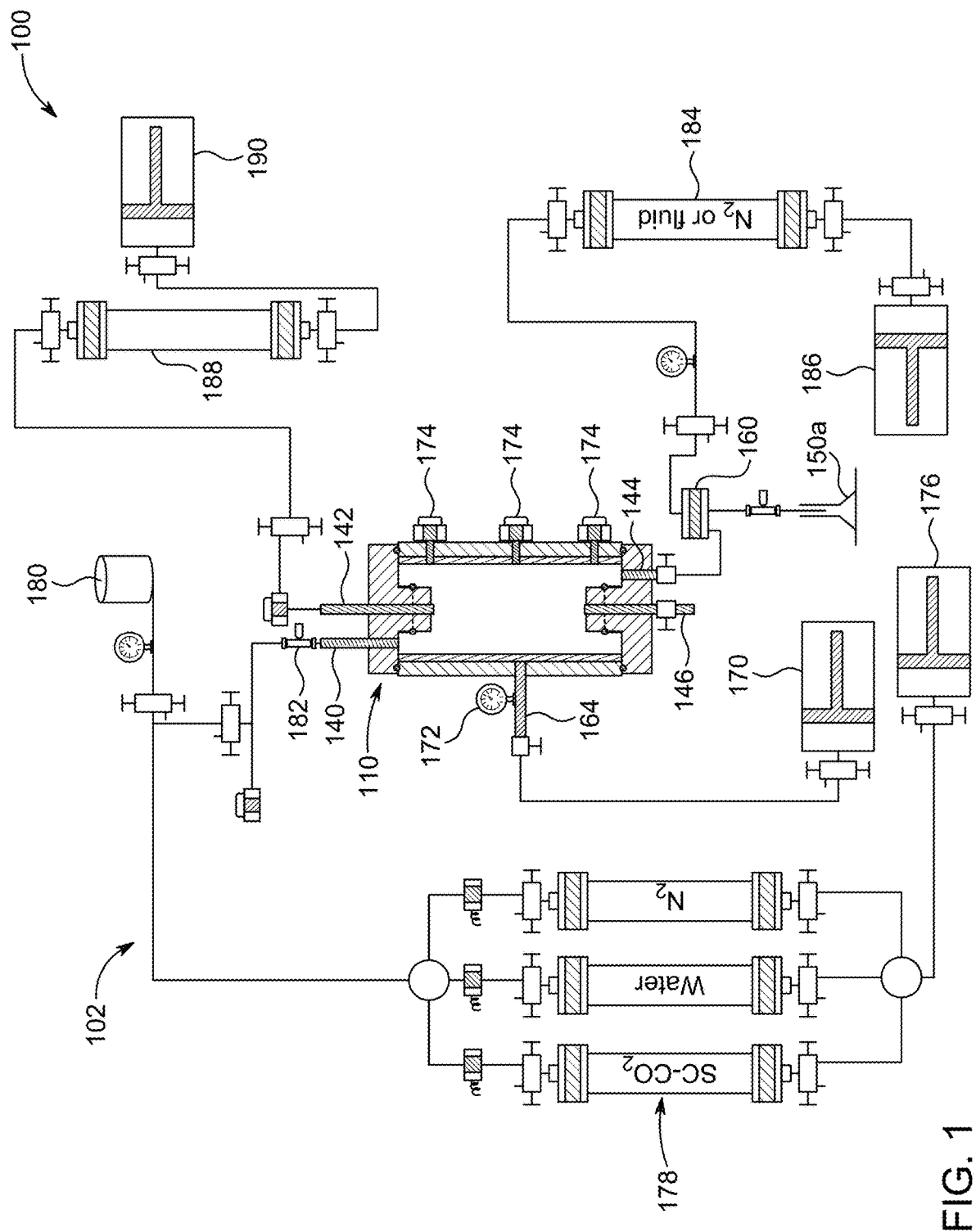
FIG. 1 is a schematic diagram of a testing pressure vessel, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a testing pressure vessel for cement to test sealability of a cement sheath after hardening (curing). The testing pressure vessel of the present disclosure is adapted to mimic secondary gas migration through annular cement and cement flaws. The testing pressure vessel is configured to provide an experimental setup which may help in testing any type of cement (e.g., Portland, expandable, geopolymer, etc.). In addition, the testing pressure vessel may also be configured to examine cement formulated with several additives, to investigate the ability of formulated cement slurry to seal an annular space at elevated pressures and temperatures. The testing pressure vessel allows an operator to test the cement sheath at temperatures, e.g., up to 350° C., and pressures, e.g., up to 6000 psi.

Figure 4:
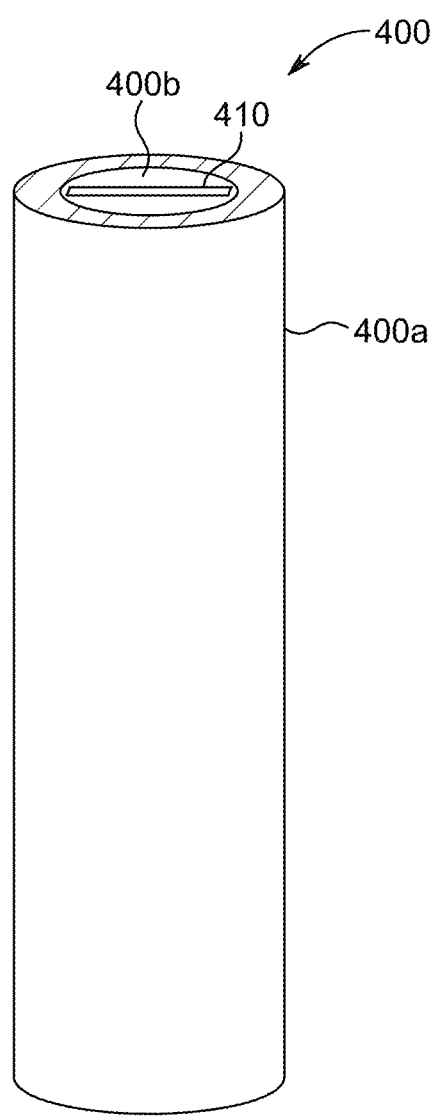
FIG. 4 is a perspective diagram of the cured concrete pipe sheath to be tested, according to certain embodiments.
Figure 5A:
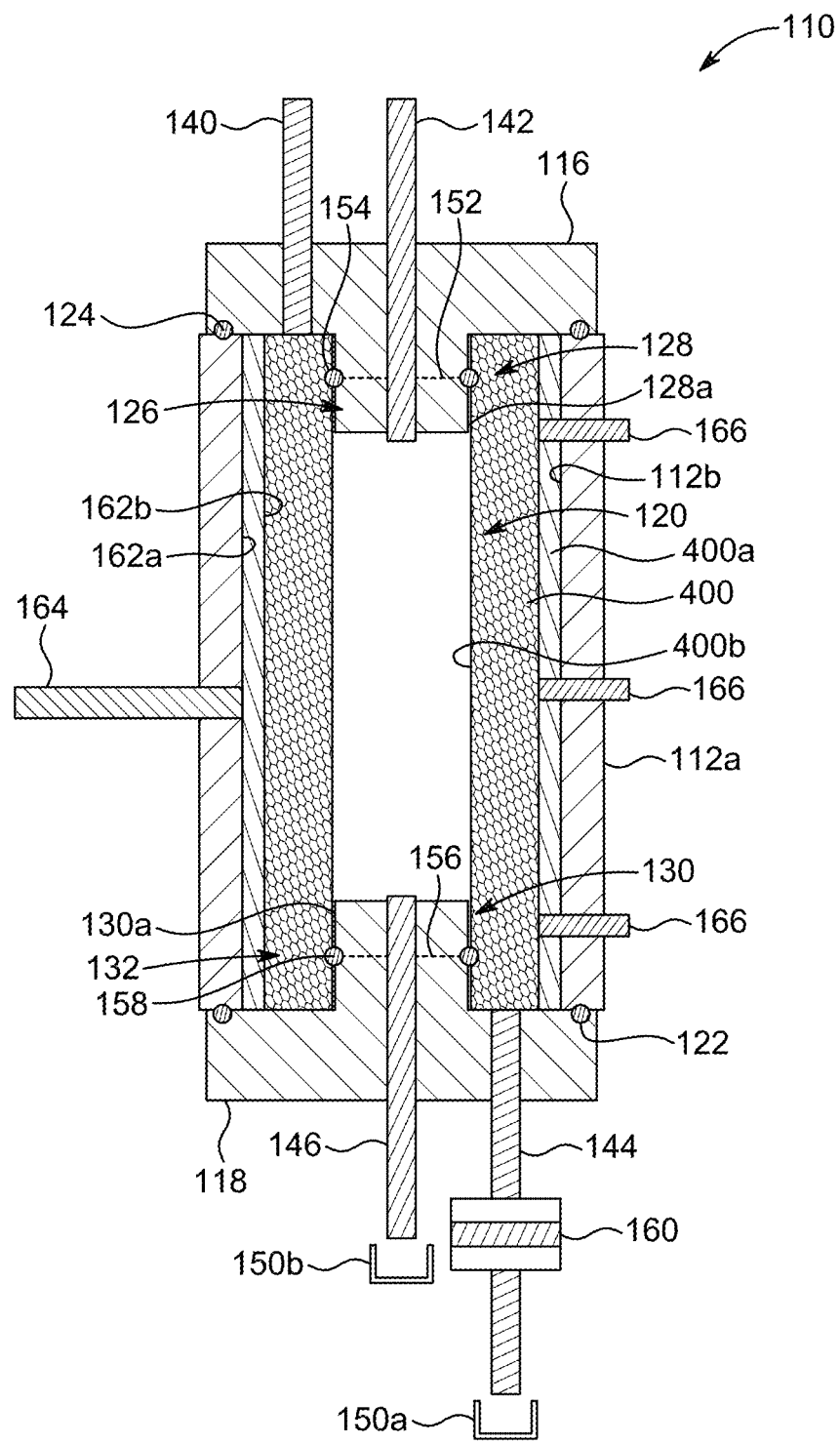
FIG. 5A is a sectioned diagram of the cylindrical pressure vessel with the cured concrete pipe sheath placed therein, according to certain embodiments.
Figure 5B:
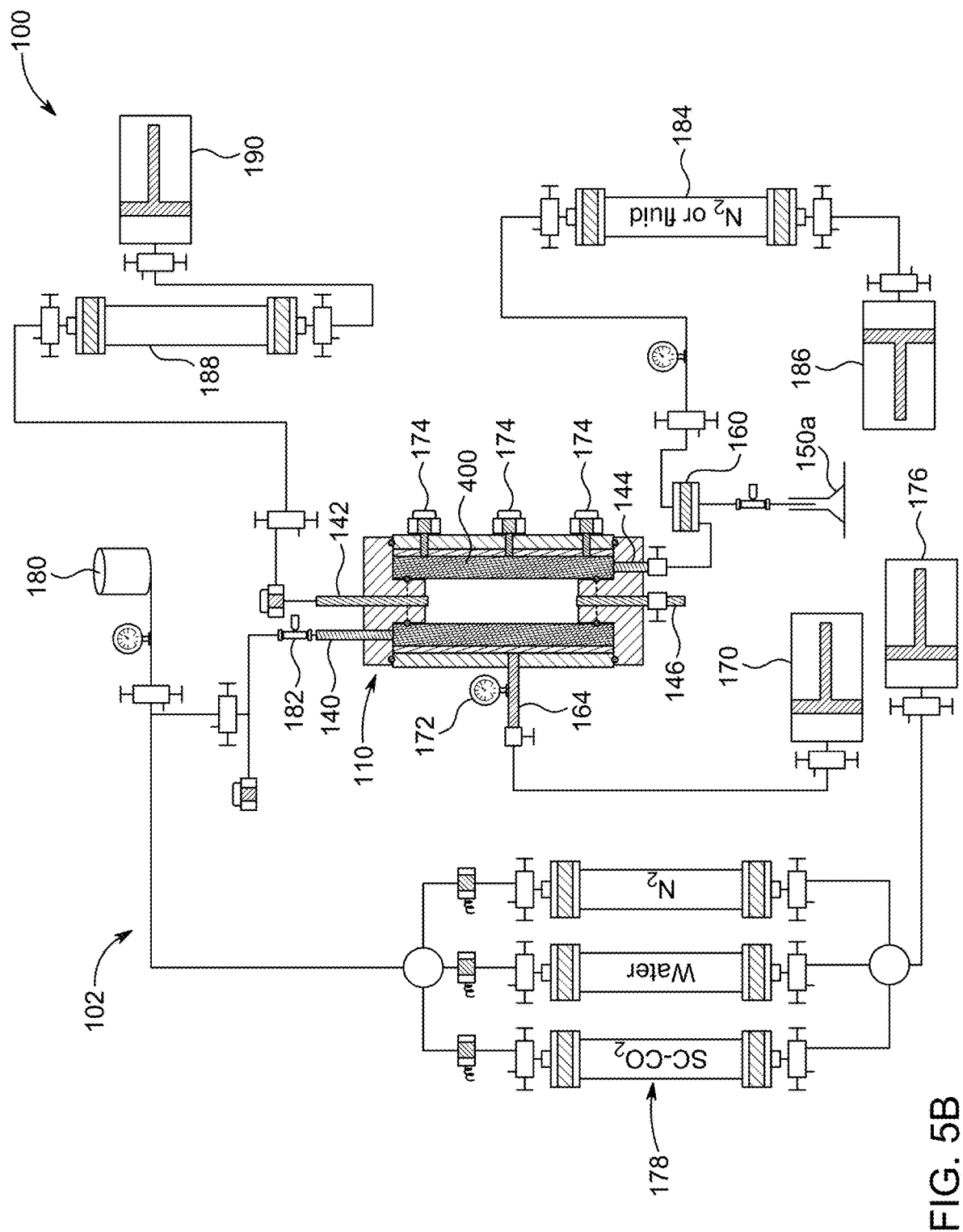
FIG. 5B is a schematic diagram of the testing pressure vessel as implemented for permeability testing of the cured concrete pipe sheath, according to certain embodiments.

Referring to FIG. 1, a diagram of a testing apparatus, or a pressure vessel used hereafter (represented by reference numeral 100) for permeability testing of a cured concrete sample (cured concrete pipe sheath used hereafter) is illustrated (as shown in FIG. 4 and represented by reference numeral 400 therein, and sometimes also referred to as "cement sheath" without any limitations). The testing pressure vessel 100 includes a testing set-up (generally referred by reference numeral 102) which may be associated with a cylindrical pressure vessel 110 for carrying out the required test(s). Herein, the cylindrical pressure vessel 110 provides space in which the cured concrete pipe sheath 400 is placed for testing purposes (as depicted in FIG. 5A). The testing set-up 102 is configured to provide elevated pressures and temperatures inside the cylindrical pressure vessel 110, mimicking conditions of an oil well or the like, to test the cured concrete pipe sheath 400 (as depicted in FIG. 5B), details of which are described later herein. In an embodiment, the testing set-up 102 includes pumps, pipes, flow meters, thermocouples, and valves. In an embodiment, the pumps of the testing set-up 102 are centrifugal or axial flow pumps, and can accommodate a flow rate of from 5 L/min to 250 L/min, preferably 25 L/min to 225 L/min, preferably 50 L/min to 200 L/min, preferably 100 L/min to 150 L/min, or 100 L/min. In an embodiment, the pipes in the testing set-up 102 that connect various components of the pressure testing vessel 100 are fabricated of metal, plastic, ceramic, a polymer, or a combination of the like. In an embodiment, the pipes of the testing set-up 102 are insulated with an insulating foam, fiberglass, or cellulose. In an embodiment, the pipes of the testing set-up 102 are fabricated or stainless steel or iron. In an embodiment, the flow meters of the testing set-up 102 can measure either a gas flow or a liquid flow, dependent on the stream. In an embodiment, the testing set-up 102 includes at least 4 gas thermocouples to measure a gas temperature of the gas streams throughout the pressure testing vessel 100. In an embodiment, the testing set-up 102 includes at least 4 liquid thermocouples to measure a liquid temperature of the liquid streams throughout the pressure testing vessel 100. In an embodiment, the testing set-up 102 includes at least 20 valves dispersed throughout the pressure testing vessel 100. In an embodiment, the valves in the testing set-up 102 are three-way valves, gate valves, bleed valves, globe valves, gate valves, or ball valves.

Figure 2A:
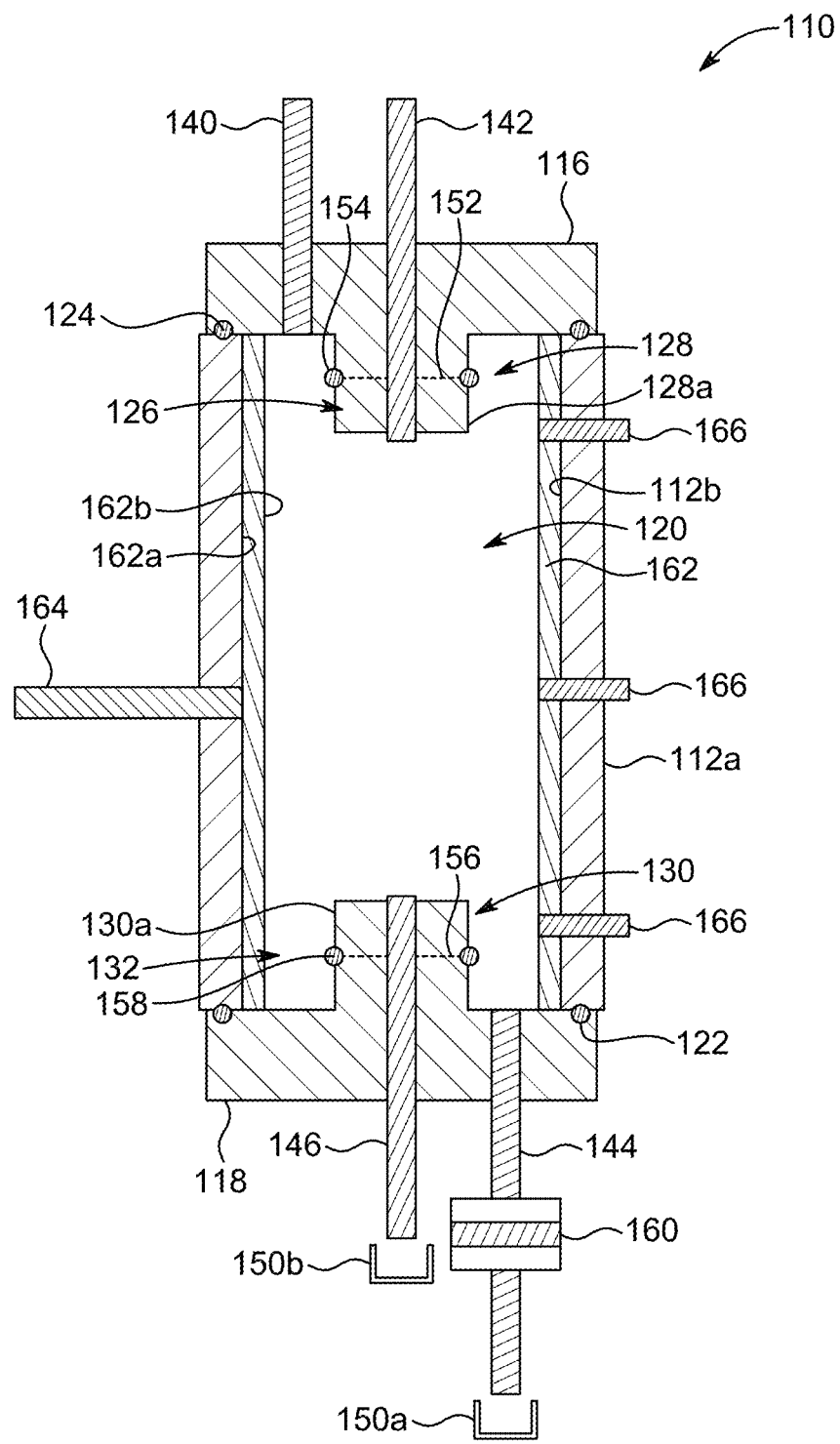
FIG. 2A is an assembled sectioned diagram of a cylindrical pressure vessel with associated components of the testing pressure vessel, according to certain embodiments.
Figure 2B:
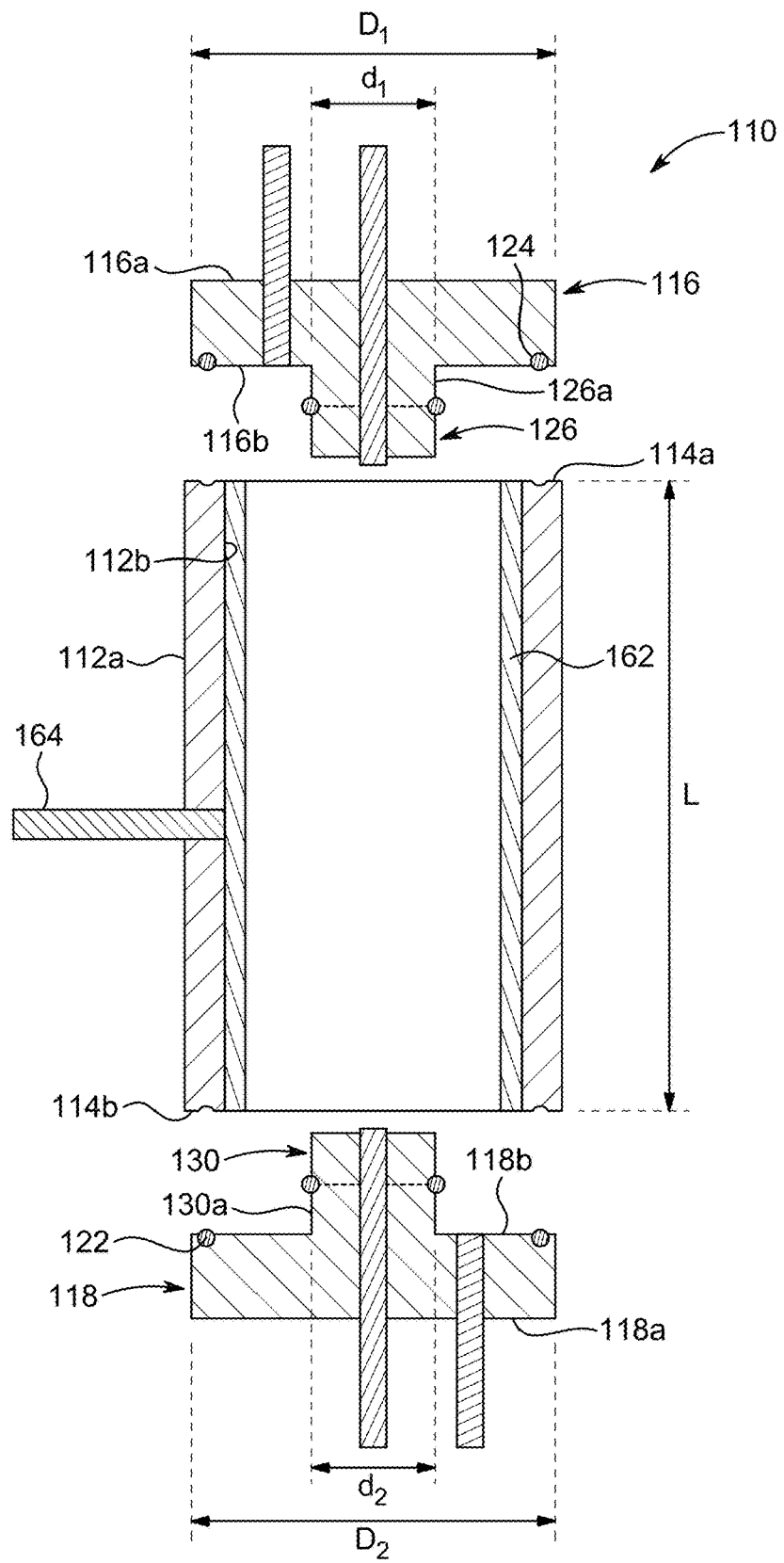
FIG. 2B is a partial exploded sectioned diagram of the cylindrical pressure vessel with associated components of the testing pressure vessel, according to certain embodiments.

Referring to FIGS. 2A and 2B in combination, illustrated are sectioned diagrams of the cylindrical pressure vessel 110 (sectioned along a vertical plane) with associated components of the testing pressure vessel 100. As shown, the cylindrical pressure vessel 110 is generally in the form of an annular housing. The cylindrical pressure vessel 110 has an outer surface 112a and an inner surface 112b, and a top face 114a and a bottom face 114b. In an embodiment, a distance from the top face 114a to the bottom face 114b is from 5 to 30 times greater than a distance from the outer surface 112a to the inner surface 112b, preferably 10 to 25 times greater, or 15 times greater. In an embodiment, an outer diameter of the cylindrical pressure vessel 110 is from 2 to times greater than the distance from the outer surface 112a to the inner surface 112b, preferably 4 to 8 times greater, or 6 times greater. The top face 114a of the cylindrical pressure vessel 110 provides a ring-shaped surface. Herein, the ring-shaped surface of the top face 114a has been represented by same reference numeral as the top face 114a in the accompanied drawings for simplicity. As used herein, the ring-shaped surface can be defined as having a region between concentric circles or cylinders. As depicted in FIGS. 2A and 2B, the top face 114a is the area between the annular cylindrical space in the cylindrical pressure vessel 110 and the outer surface 112a of the cylindrical pressure vessel 110. Similarly, the bottom face 114b of the cylindrical pressure vessel 110 provides a ring-shaped surface thereat. Herein, the ring-shaped surface of the bottom face 114b has been represented by same reference numeral as the bottom face 114b in the accompanied drawings for simplicity.

As better shown in FIG. 2B, the cylindrical pressure vessel 110 includes a top cap 116 and a bottom cap 118. In an embodiment, the top cap 116 and bottom cap 118 are t-shaped, to allow easier insertion and sealing of the cylindrical pressure vessel 110. The top cap 116 has an outer surface 116a and an inner surface 116b, and the bottom cap 118 has an outer surface 118a and an inner surface 118b. Herein, the top cap 116 is adapted to sit on the top face 114a of the cylindrical pressure vessel 110, and the bottom cap 118 is adapted to sit on the bottom face 114b of the cylindrical pressure vessel 110 (as depicted in FIG. 2A), thereby defining an enclosed space 120 inside the cylindrical pressure vessel 110. In particular, the bottom cap 118 has a first mating surface, which is generally same as the inner surface 118b of the bottom cap 118 and referred by same numeral in the accompanied drawings for simplicity, such that the first mating surface 118b is configured to contact the ring-shaped surface 114b (i.e., the bottom face 114b) of the cylindrical pressure vessel 110. Similarly, the top cap 116 has a second mating surface, which is generally same as the inner surface 116b of the top cap 116 and referred by same numeral in the accompanied drawings for simplicity, such that the second mating surface 116b is configured to contact the ring-shaped surface 114a (i.e., the top face 114a) of the cylindrical pressure vessel 110. Further, as shown, the bottom cap 118 accommodates an O-ring 122 to seal the bottom cap 118 to the bottom face 114b of the cylindrical pressure vessel 110. Similarly, the top cap 116 accommodates an O-ring 124 to seal the top cap 116 to the top face 114a of the cylindrical pressure vessel 110. In an embodiment, there are at least 4 O-rings 122 on the bottom cap 118, preferably at least 6, preferably at least 8, or at least 10. In an embodiment, there are at least 4 O-rings 124 on the top cap 116, preferably at least 6, preferably at least 8, or at least 10. In an embodiment, the O-rings 122 and O-rings 124 are fabricated of plastic or metal. In an embodiment, the O-rings 122 and O-rings 124 are fit around knobs or screws protruding from the outer surface 112a of the cylindrical pressure vessel 110 for both the bottom cap 118 and top cap 116 respectively, to ensure a tight seal.

Also, as shown in FIG. 2B, the top cap 116 has a top cylindrical protrusion 126 extending therefrom. Specifically, the top cylindrical protrusion 126 is extending from the inner surface 116b of the top cap 116. The top cylindrical protrusion 126 has an outer cylindrical surface 126a. Herein, the top cylindrical protrusion 126 has a diameter 'd1' less than a diameter 'D1' of the top cap 116. In an embodiment, the diameter D1 is from 2 to 6 times greater than the diameter d1, preferably 3 to 5 times greater, or 4 times greater. As depicted in FIG. 2A, the top cylindrical protrusion 126 is configured to insert into the enclosed space 120 of the cylindrical pressure vessel 110 forming an upper annular space 128 as disposed between the outer cylindrical surface 126a of the top cylindrical protrusion 126 and the inner surface 112b of the cylindrical pressure vessel 110. Similarly, as shown in FIG. 2B, the bottom cap 118 has a bottom cylindrical protrusion 130 extending therefrom. Specifically, the bottom cylindrical protrusion 130 is extending from the inner surface 118b of the bottom cap 118. The bottom cylindrical protrusion 130 has an outer cylindrical surface 130a. The bottom cylindrical protrusion 130 has a diameter 'd2' less than a diameter 'D2' of the bottom cap 118. In an embodiment, the diameter D2 is from 2 to 6 times greater than the diameter d2, preferably 3 to 5 times greater, or 4 times greater. As depicted in FIG. 2A, the bottom cylindrical protrusion 130 is configured to insert into the enclosed space 120 of the cylindrical pressure vessel 110 forming a lower annular space 132 between the outer cylindrical surface 130a of the bottom cylindrical protrusion 130 and the inner surface 112b of the cylindrical pressure vessel 110. In an embodiment, the diameters D1 and D2 are the same diameter. In an embodiment, the diameter D1 is from 5 to 15% greater than the diameter D2, or 10% greater. In an embodiment, the diameter D2 is from 5 to 15% greater than the diameter D1, or 10% greater. In an embodiment, the diameters d1 and d2 are the same diameter. In an embodiment, the diameter d1 is from 5 to 15% greater than the diameter d2, or 10% greater. In an embodiment, the diameter d2 is from 5 to 15% greater than the diameter d1, or 10% greater.

Further, as shown in FIGS. 2A and 2B, the top cap 116 has a sample injection port 140 passing from the outer surface 116a of the top cap 116 to the inner surface 116b of the top cap 116. In an embodiment, the diameter d1 is from 2 to 6 times greater than a diameter of the sample injection port 140, preferably 3 to 5 times greater, or 4 times greater. The top cap 116 also has a casing fluid injection port 142 passing from the outer surface 116a of the top cap 116 to the inner surface 116b of the top cap 116. In an embodiment, the diameter d2 is from 2 to 6 times greater than a diameter of the casing fluid injection port 142, preferably 3 to 5 times greater, or 4 times greater. In an embodiment, the casing fluid injection port 142 is axially aligned with the cylindrical pressure vessel 110, while the sample injection port 140 is offset from axial alignment with the cylindrical pressure vessel 110. The sample injection port 140 is so arranged to fluidly connect at the upper annular space 128 within the enclosed space 120 of the cylindrical pressure vessel 110. The sample injection port 140 is adapted to provide a sample injection fluid (from the testing set-up 102, as discussed later) passing therethrough and into the enclosed space 120 of the cylindrical pressure vessel 110. The casing fluid injection port 142 is adapted to provide an injected casing fluid (from the testing set-up 102, as discussed later) passing therethrough and into the enclosed space 120 of the cylindrical pressure vessel 110. Similarly, the bottom cap 118 has an outlet port 144 passing from the inner surface 118b of the bottom cap 118 to the outer surface 118a of the bottom cap 118. In an embodiment, the diameter d2 is from 2 to 6 times greater than a diameter of the outlet port 144, preferably 3 to 5 times greater, or 4 times greater. The bottom cap 118 also has a casing fluid outlet port 146 passing from the outer surface 118a of the bottom cap 118 to the inner surface 118b of the bottom cap 118. In an embodiment, the diameter d2 is from 2 to 6 times greater than a diameter of the casing fluid outlet port 146, preferably 3 to 5 times greater, or 4 times greater. In an embodiment, the diameters of the sample injection port 140, the casing fluid injection port 142, the outlet part 144, and the casing fluid outlet port 146 are all the same diameters. In an embodiment, the casing fluid outlet port 146 is axially aligned with the cylindrical pressure vessel 110, while the outlet port 144 is offset from axial alignment with the cylindrical pressure vessel 110. The outlet port 144 is so arranged to fluidly connect at the lower annular space 132 within the enclosed space 120 of the cylindrical pressure vessel 110. The outlet port 144 is adapted to receive the sample injection fluid from the enclosed space 120 of the cylindrical pressure vessel 110 (or specifically from the cured concrete pipe sheath 400 as placed in the lower annular space 132 during testing, as discussed later) to be removed from the cylindrical pressure vessel 110 (to the testing set-up 102, as discussed later). Further, the casing fluid outlet port 146 is adapted to receive the injected casing fluid (as injected via the casing fluid injection port 142) from the enclosed space 120 of the cylindrical pressure vessel 110 (to the testing set-up 102, as discussed later). It may be appreciated that, as used herein, the term "port" may refer to a connection, such as a pipe, for passing of fluid therethrough. Further, it may be appreciated that in other examples, the fluids may enter from the ports 144, 146 in the bottom cap 118 to the cylindrical pressure vessel 110. In still other examples, the fluids may enter from both the ports 140, 142 in the top cap 116 as well as the ports 144, 146 in the bottom cap 118 without departing from the scope of the present disclosure.

In some examples, as depicted in FIG. 2A, the sample injection fluid passing through the sample injection port 140 is collected with a container 150a positioned by the outlet port 144 at the outer surface 118a of the bottom cap 118, and the injected casing fluid passing through the casing fluid injection port 142 is collected with a container 150b positioned by the casing fluid outlet port 146 at the outer surface 118a of the bottom cap 118. In an embodiment, the containers 150a and 150b are substantially rectangular. In an embodiment, the containers 150a and 150b are fabricated of metal or plastic. In an embodiment, the containers 150a and 150b can accommodate a volume of from 2 L to 10 L, preferably 4 L to 8 L, or 6 L. Further, as illustrated, the top cap 116 has a porous frit 152 configured to allow uniform distribution of the injected casing fluid passing through the casing fluid injection port 142 to the cylindrical pressure vessel 110. As shown, the porous frit 152 may be supported by an O-ring 154 in the top cap 116. In an embodiment, the O-ring 154 is fabricated of plastic. In some embodiments, the porous frit 152 may be extended laterally to cover the upper annular space 128 and thus configured to allow uniform distribution of the sample injection fluid passing through the sample injection port 140 to the cylindrical pressure vessel 110. In an embodiment, the porous frit 152 is made of glass or metal. In an embodiment, the porous frit 152 may be coupled to the top cap 116. In an embodiment, the porous frit 152 may be removable from the top cap 116. In an embodiment, the porous frit 152 has a pore size in the range of 4 to 200 mm, preferably from 20 to 180 mm, preferably from 40 to 160 mm, preferably from 60 to 140 mm, preferably from 80 to 120 mm, or 100 mm. Similarly, the bottom cap 118 has a porous frit 156 configured to allow uniform distribution of the injected casing fluid passing through the casing fluid injection port 142 to the cylindrical pressure vessel 110 and through the casing fluid outlet port 146. As shown, the porous frit 156 may be supported by an O-ring 158 in the bottom cap 118. In an embodiment, the O-ring 158 is fabricated of plastic. In some embodiments, the porous frit 156 may be extended laterally to cover the lower annular space 132 and thus configured to allow uniform distribution of the sample injection fluid passing through the sample injection port 140 to the cylindrical pressure vessel 110 and through the outlet port 144. In an embodiment, the porous frit 156 is made of glass or metal. In an embodiment, the porous frit 156 may be coupled to the bottom cap 118. In an embodiment, the porous frit 156 may be removable from the bottom cap 118. In an embodiment, the porous frit 156 has a pore size in the range of 4 to 200 mm, preferably from 20 to 180 mm, preferably from 40 to 160 mm, preferably from 60 to 140 mm, preferably from 80 to 120 mm, or 100 mm.

Figure 2C:
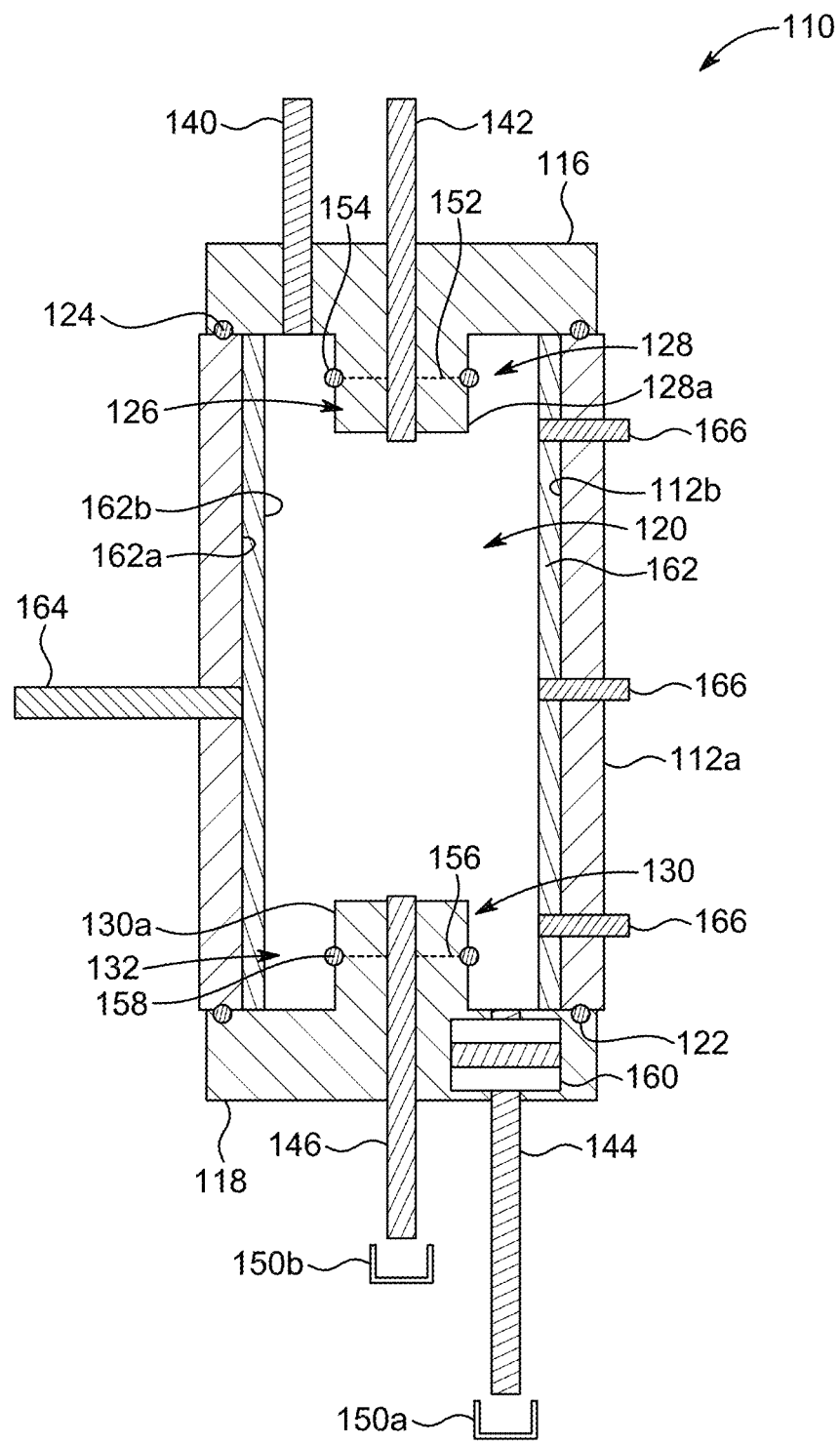
FIG. 2C is an assembled sectioned diagram of the cylindrical pressure vessel with associated components of the testing pressure vessel, according to alternative embodiments.

Further, as illustrated in FIGS. 2A and 2B, the outlet port 144 includes a back-pressure regulator (BPR) 160 associated therewith. The BPR 160 is configured to regulate pressure of the sample injection fluid passing therethrough. In particular, the BPR 160 is configured to control pore pressure of the cured concrete pipe sheath 400 when placed in the cylindrical pressure vessel 110, as discussed later in more detail. In an embodiment, the BPR 160 supplies an inert gas to the cement pipe sheath 400 to control the pore pressure. In an embodiment, the inert gas is nitrogen. In an embodiment, the BPR 160 includes a flow meter and flow controller to measure the gas flow rate of nitrogen. In an embodiment, as shown in FIG. 2A, the BPR 160 is positioned outside of the bottom cap 118. In an alternate embodiment, as shown in FIG. 2C, the BPR 160 is positioned between the inner surface 118b of the bottom cap 118 and the outer surface 118a of the bottom cap 118.

As illustrated in FIG. 2A, the testing pressure vessel 100 further includes a sleeve 162 having an outer surface 162a and an inner surface 162b. In an example, the sleeve 162 is fabricated of rubber. Herein, the sleeve 162 is in the form of an annular member dimensioned as per diameter of enclosed space 120 of the cylindrical pressure vessel 110. As shown, the sleeve 162 is positioned inside the cylindrical pressure vessel 110, such that the outer surface 162a of the sleeve 162 is in contact with the inner surface 112b of the cylindrical pressure vessel 110. In an embodiment, the diameter of the sleeve 162, between a diameter of the outer surface 162a and a diameter of the inner surface 162b, is from 0.7 to 0.9 times greater than the diameter of any of the injection port 140, the casing fluid injection port 142, the outlet part 144, and the casing fluid outlet port 146. In an embodiment, the rubber sleeve 162 can be formed using machining or laminating techniques from materials including, for example, epoxy or resins. The testing pressure vessel 100 further includes a hydraulic inlet 164. The hydraulic inlet 164 is passing from the outer surface 112a of the cylindrical pressure vessel 110 to the outer surface 162a of the sleeve 162, such that the sleeve 162 is positioned adjacent to the inner surface 112b of the cylindrical pressure vessel 110 and the hydraulic inlet 164. In an embodiment, a diameter of the hydraulic inlet 164 is from 1.1 to 1.3 times greater than the diameter of any of the injection port 140, the casing fluid injection port 142, the outlet part 144, and the casing fluid outlet port 146. In an embodiment, the diameter of the hydraulic inlet 164 is from 1.4 to 1.6 times greater the diameter of the sleeve 162. The hydraulic inlet 164 is configured to provide a confining pressure to the cylindrical pressure vessel 110, as discussed later in more detail. The testing pressure vessel 100 further includes a plurality of pressure ports 166 mounted proximal to the sleeve 162. The plurality of pressure ports 166 is configured to measure a pressure exerted on the sleeve 162 in the cylindrical pressure vessel 110, when the confining pressure is applied thereto. In the present embodiment, as illustrated, the plurality of pressure ports 166 is at least 3. That is, the testing pressure vessel 100 may include least three number of pressure ports 166. In an embodiment, the testing pressure vessel 100 may include from 4 to 10 pressure ports 166, preferably 6 to 8 pressure ports, or 7 pressure ports. In an embodiment, the pressure ports 166 are substantially cylindrical and have a diameter that is from 0.6 to 0.8 times greater than the diameter of the hydraulic inlet 164. In an embodiment, an individual pressure port 166 of the plurality of pressure ports 166 is separated from a neighboring pressure port 166 by a distance of from 15-30% of a total length 'L' (as shown in FIG. 2B) of the cylindrical pressure vessel 110, preferably from 20-25%, or 22.5%. In the present exemplary illustration, the plurality of pressure ports 166 are shown disposed equidistant along the total length 'L' of the cylindrical pressure vessel 110. In an embodiment, the total length of the cylindrical pressure vessel 110 is from 250 mm to 2500 mm, preferably from 500 mm to 2000 mm, or 1000 mm. In an embodiment, the top cap 116 and bottom cap 118 each have a total length that is from 0.4 to 0.8 times the total length L of the cylindrical pressure vessel 110, preferably 0.5 to 0.7 times the length, or 0.6 times the length.

Referring to FIG. 1, the testing set-up 102 of the testing pressure vessel 100 includes a syringe 170 (specifically, a syringe pump) associated with the hydraulic inlet 164.

Herein, the syringe 170 provide a pressurized fluid to the hydraulic inlet 164, to provide confining pressure to the cylindrical pressure vessel 110 therefrom. In some examples, as illustrated, a flow meter 172 may be provided with the hydraulic inlet 164 to measure flow of the pressurized fluid therefrom. In an embodiment, the flow meter 172 is a vortex, multi-phase, or magnetic flow meter. Further, valves (as shown) may be associated to control flow of the pressurized fluid from the syringe 170 to the hydraulic inlet 164. In an example, the syringe 170 accommodates the confining pressure of from 5000 pounds per square inch (psi) to 6000 psi, preferably from 5250 psi to 5750 psi, or 5500 psi. The testing set-up 102 of the testing pressure vessel 100 further includes a plurality of pressure transducers 174 mounted to the outer surface 112*a* of the cylindrical pressure vessel 110 to be associated with the plurality of pressure ports 166, as shown. The plurality of pressure transducers 174 may be configured to measure the confining pressure in the cylindrical pressure vessel 110. As shown in FIG. 1, the testing set-up 102 of the testing pressure vessel 100 further provides an effluent circuit to provide the sample injection fluid at a pressure to the sample injection port 140 of the cylindrical pressure vessel 110, via a pump 176, a gas source 178 and a gas reservoir 180. In an embodiment, the pump 176 is an axial flow pump and can accommodate a flow rate of from 5 L/min to 25 L/min, preferably from 10 L/min to 20 L/min, or 15 L/min. In an embodiment, the gas source 178 is a metal cylinder and comprises at least 3 metal cylinders. In an embodiment, the three gas sources are respectively Sc—$CO_2$, water, and nitrogen. In an embodiment, the has reservoir 180 is fabricated of metal and can accommodate a gas volume of from 50 L to 250 L, preferably 100 L to 200 L, or 150 L. The effluent circuit further includes a gas flow meter 182 to determine a gas flow rate of an effluent (i.e., the sample injection fluid) running through the cylindrical pressure vessel 110. In an example, the sample injection port 140 is configured to accommodate a flow of the sample injection fluid in a range from 0.00025 to 80 cubic centimeters per minute (cc/min), preferably 1 cc/min to 70 cc/min, preferably 10 cc/min to 60 cc/min, preferably 20 cc/min to 50 cc/min, or 35 cc/min. In an embodiment, the effluent is an inert gas as provided by the gas source 178 and the gas reservoir 180. In an example, the inert gas is nitrogen or helium. The testing set-up 102 of the testing pressure vessel 100, as part of the effluent circuit, may further include a gas source 184 and a pump 186 to provide back pressure (i.e., the sample injection fluid from other direction). In an embodiment, the gas source 184 is a metal cylinder and comprises nitrogen. In an embodiment, the pump 186 is an axial flow pump and can accommodate a flow rate of from 5 L/min to 25 L/min, preferably from 10 L/min to 20 L/min, or 15 L/min. The testing set-up 102 of the testing pressure vessel 100, as part of the effluent circuit, may further include the BPR 160 and the container 150*a*. Herein the BPR 160 is configured to maintain a defined pressure upstream (i.e., inside the cylindrical pressure vessel 110). In an embodiment, the testing set-up 102 of the testing pressure vessel 100 may also be configured to provide the injected casing fluid into the cylindrical pressure vessel 110. As shown in FIG. 1, the testing set-up 102 may provide a casing fluid circuit providing the casing fluid via a casing fluid source 188 and a pump 190, to be passed through the casing fluid injection port 142 into the cylindrical pressure vessel 110. In an embodiment, the casing fluid source 188 is a metal cylinder and comprises the casing fluid. In an embodiment, the pump 186 is an axial flow pump and can accommodate a flow rate of from 5 L/min to 25 L/min, preferably from 10 L/min to 20 L/min, or 15 L/min. Further, as shown, the testing set-up 102 of the testing pressure vessel 100 may include other supporting components, such as valves, transducers, flow meters, pressure gauges, etc. to support its functioning, which may be contemplated by a person skilled in the art and thus not described herein for the brevity of the present disclosure.

Figure 3:
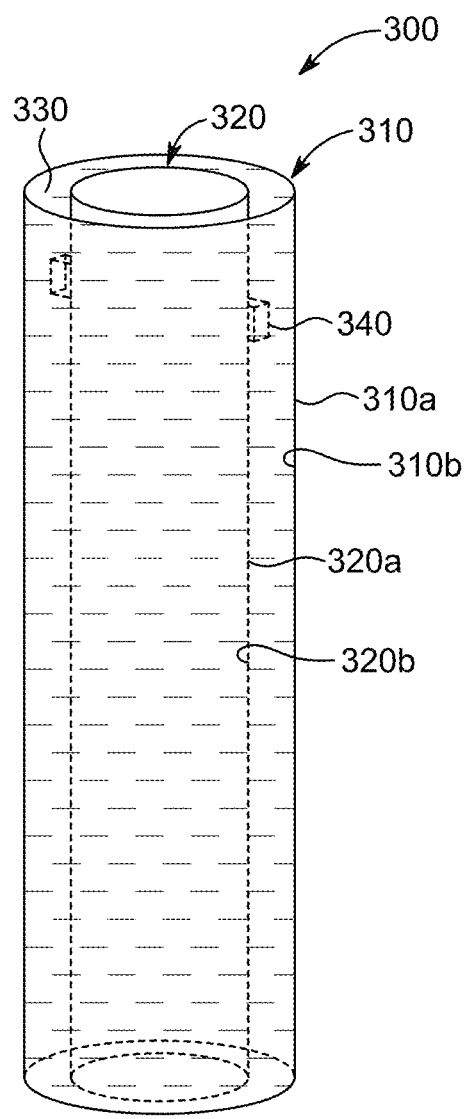
FIG. 3 is a perspective diagram of a mold for forming a cured concrete pipe sheath, according to certain embodiments.

Referring to FIG. 3, illustrated is a diagram of a mold (represented by reference numeral 300) for forming the cured concrete pipe sheath 400 (as shown in FIG. 4). Herein, the mold 300 is utilized to prepare a cement slurry 330, which is then shaped and cured to form the cured concrete pipe sheath 400, which, in turn, is placed in the testing pressure vessel 100 for permeability testing thereof. As shown, the mold 300 includes an outer pipe 310 and an inner pipe 320. The outer pipe 310 has an outer surface 310*a* and an inner surface 310*b*, and the inner pipe 320 has an outer surface 320*a* and an inner surface 320*b*. The inner pipe 320 is axially aligned and placed inside the outer pipe 310, to define a space between the outer surface 320*a* of the inner pipe 320 and the inner surface 310*b* of the outer pipe 310. In an embodiment, the length of the outer pipe 310 is from 50 cm to 100 cm, preferably from 60 cm to 90 cm, preferably from 70 cm to 80 cm, or 75 cm. In an embodiment, the inner diameter of the outer pipe 310 has a diameter from 10 cm to 20 cm, preferably 15 cm. In an embodiment, the length of the inner pipe 320 is from 40 cm to 80 cm, preferably from 50 cm to 70 cm, or 70 cm. In an embodiment, the inner pipe 320 has a diameter of from 5 cm to 15 cm, preferably 10 cm. In an embodiment, the outer surface 320*a* includes an amount of lubricant applied on its' walls to facilitate removal of the mold 300 from the cement slurry 330 without sticking. In an example, the outer pipe 310 has a length of about 76.2 cm and an internal diameter of about 15.24 cm, and the inner pipe 320 has a length of about 60.69 cm and an outer diameter of about 11.34 cm. It may be understood that dimensions of the outer pipe 310 and the inner pipe 320 in the mold 300 may be defined based on required dimensions of the sample of the cured concrete pipe sheath 400 (as prepared thereby) to be placed inside the cylindrical pressure vessel 110.

In an example, the cement slurry is prepared by mixing cement with water in pre-determined proportions depending on desired mechanical properties for the cured concrete pipe sheath 400 to be tested. In some examples, cement additives may be added to the cement slurry to achieve the mechanical properties for the cured concrete pipe sheath 400. The cement additives are at least one additive selected from a group consisting of accelerators, retarders, dispersants, extenders, weighting agents, gels, foamers, and fluid loss additives. Such cement additives are known in the art and thus not described herein. The cement slurry, as prepared and represented by reference numeral 330, is poured inside the said space between the outer pipe 310 and the inner pipe 320 of the mold 300. In some examples, a vibrator (not shown) is employed to mix the cement slurry 330 within the mold 300. Herein, the vibrator is configured to purge entrapped air inside the cement slurry 330. In some examples, prior to cement preparation, the mold 300 may be first prepared by greasing the outer surface 310*a* of the outer pipe 310 and tightening the outer pipe 310 and the inner pipe 320 together by using flanges and flange caps (not shown, but as may be contemplated).

The mold 300 allows the cement slurry 330 to set and take the shape and dimensions complementary to the cylindrical pressure vessel 110. Then, the mold 300 may be placed inside an oven (not shown) at a desired temperature to cure the cement slurry 330. In the present implementations, the curing time of the cement slurry 330 is at least 12 hours. Once the curing is achieved, the mold 300 is removed from the oven, and the outer pipe 310 is taken off. It may be understood that for intact samples, the inner pipe 320 may not be loosened, and the cured concrete pipe sheath 400 along with the inner pipe 320 may be placed in the cylindrical pressure vessel 110, to examine its permeability/sealability using the testing pressure vessel 100 of the present disclosure.

In some examples, for investigating the effect of pressure on microannulus response, a microannulus (as represented by reference numeral 410 in FIG. 4) may need to be created intentionally in the cured concrete pipe sheath 400. For this purpose, a microfilm 340 with known thickness is placed on the outer surface 320a of the inner pipe 320. In an embodiment, the length of the outer pipe is of from 15 to 75 times greater than a length of the microfilm 340, preferably from 30 to 60 times greater, or 45 times greater. In an embodiment, there is of from to 30 microfilms 340 along the outer surface 320a, preferably from 15 to 25, or 20 microfilms. In an embodiment, the microannulus 410 has a diameter that is equal to the diameter of the inner pipe 320. In an embodiment, the microannulus 410 has a diameter that is different than the diameter of the inner pipe 320. The microfilm 340 is wrapped on the outer surface 320a of the inner pipe 320 of the mold 300 several times, depending on the required thickness of the microannulus 410. Then, the cement slurry 330 is poured into the mold 300, and post that the mold 300 may be placed in the oven at a desired temperature for curing the cement slurry 330 into the cured concrete pipe sheath 400. Herein, as shown in FIG. 4, the cured concrete pipe sheath 400 with an outer surface 400a and an inner surface 400b, has the microannulus 410 defined on the inner surface 400b thereof. In an embodiment, a spacer fluid is added to the microannulus 410 to physically isolate one special-purpose fluid from another. It may be undesirable for one special-purpose fluid to mix with another used in the well, so a spacer fluid compatible with each is used between the two. A spacer fluid is usually used when changing between well fluids used in a well. In this case the spacer fluid is used to separate the cement slurry from other fluids in the wellbore. In an embodiment, the spacing fluid is a sulfonated styrene copolymer dispersant with one or more additional components such as surfactants or viscosifiers.

Referring to FIG. 5A, illustrated is a sectioned diagram of the cylindrical pressure vessel 110 with the cured concrete pipe sheath 400 placed therein. Herein, first, the cured concrete pipe sheath 400 (with or without the inner pipe 320 of the mold 300) is positioned in the cylindrical pressure vessel 110. Then, the sleeve 162 is placed around the cured concrete pipe sheath 400, such that the inner surface 162b of the sleeve 162 is contact with the outer surface 400a of the cured concrete pipe sheath 400, for applying the confining pressure thereto. Thereafter, the top cap 116 and the bottom cap 118 are tightened on to the cylindrical pressure vessel 110. It may be seen that the cured concrete pipe sheath 400 may be disposed between the upper annular space 128 and the lower annular space 132 of the cylindrical pressure vessel 110. The pressure transducers 174 (not shown in FIG. 5A) may then be mounted on the cylindrical pressure vessel 110. Once all the connections are made, the cured concrete pipe sheath 400 inside the cylindrical pressure vessel 110 is ready for testing using the testing pressure vessel 100.

Referring to FIG. 5B, illustrated is a schematic diagram of the testing pressure vessel 100 as implemented for permeability testing of the cured concrete pipe sheath 400. During testing, the confining pressure is gradually applied on the cured concrete pipe sheath 400 by providing the pressurized fluid from the syringe 170 to the hydraulic inlet 164. Once the confining pressure reaches about 300 psi, the injection pressure is applied to the cured concrete pipe sheath 400 by supplying the inert gas (i.e., the sample injection fluid) at a low pressure to the sample injection port 140 of the cylindrical pressure vessel 110. In an embodiment, the inert gas is helium or nitrogen. The sample injection fluid may enter the cured concrete pipe sheath 400 from top via the sample injection port 140 in the top cap 116, or bottom via the outlet port 144 in the bottom cap 118, to mimic fluid migration through cement sheath at constant pressure or constant flow rate. The top cap 116 and the bottom cap 118 have the respective porous frits 152, 156 to allow uniform distribution of the sample injection fluid across the whole annular area. The sample injection fluid is controlled by the pump 176 which can provide a constant flow rate ranging from 0.00025 to 80 cc/min and may also provide a constant pressure up to 6000 psi. The BPR 160, in the effluent circuit, regulates back pressure of the sample injection fluid, to control the pore pressure of the cured concrete pipe sheath 400. Herein, the PBR 160 may be activated by injecting gas into it via the gas source 184 and the pump 186, to keep a desired pressure differential across the cured concrete pipe sheath 400. The confining pressure is then raised gradually, keeping about 300 psi difference between the confining pressure and injection pressure, until the desired injection pressure is achieved. Then, the injection pressure may be left for couple of hours (or as required) to test whether the cured concrete pipe sheath 400 is able to prevent the gas migration or not. It may be understood that the gas may migrate to the effluent if the cured concrete pipe sheath 400 fails to prevent gas invasion. If gas is produced at the effluent, the permeability of the cured concrete pipe sheath 400 is measured using the pressure transducers 174. It may be appreciated that the cylindrical pressure vessel 110 has three pressure ports 166 to mount the pressure transducers 174 and thereby measure the pressure drop across a sample length of the cured concrete pipe sheath 400. Based on the permeability value, if required, a new cement slurry may be mixed with different concentration of the same additives (as used to prepare first sample of the cement slurry 330), or may be prepared with different additives, and the testing may be repeated for such samples until a cement composition for the cement slurry 330 imparting desired properties to the cured concrete pipe sheath 400 is found.

In addition, the testing pressure vessel 100 of the present disclosure may also help to investigate effect of pressure cycling (ballooning) on the cured concrete pipe sheath 400 by injecting the casing fluid (water or any type of fluid), via the casing fluid injection port 142, inside the cured concrete pipe sheath 400 (or inner pipe 320 of the mold 300, if placed therewith) to mimic the effect of ballooning as in oilfield wells; and hence may help examine the effect of current standard for testing a casing of the oil well along with the cured concrete pipe sheath 400. Also, the testing pressure vessel 100 may also be employed to investigate response from presence of microannulus 410 (as formed) in the cured concrete pipe sheath 400, due to temperature cycling, pressure cycling, confining pressure, and formation pressure.

Figure 6:
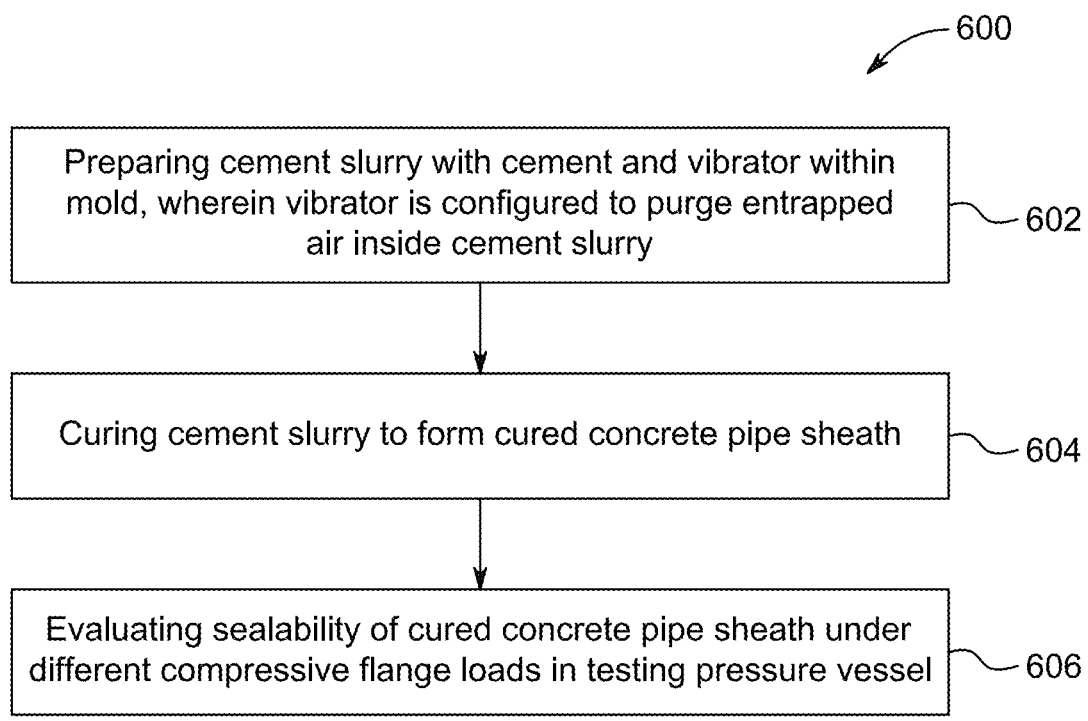
FIG. 6 is an exemplary flowchart of a method for evaluating a sealability of the cured concrete pipe sheath with the testing pressure vessel, according to certain embodiments.

Referring to FIG. 6, illustrated is an exemplary flowchart of a method (represented by reference numeral 600) for evaluating a sealability of the cured concrete pipe sheath 400 with the testing pressure vessel 100. First, the method 600 includes forming the cured concrete pipe sheath 400. Thereafter, the method 600 includes evaluating the sealability of the cured concrete pipe sheath 400 using the testing pressure vessel 100. The various teachings as discussed in the preceding paragraphs with respect to the description of the testing pressure vessel 100 apply mutatis mutandis to the method 600 of the present disclosure.

At step 602, the method 600 includes preparing the cement slurry 330 with cement and the vibrator within the mold 300, wherein the vibrator is configured to purge entrapped air inside the cement slurry 330. For this purpose, the cement slurry 330 is poured inside the space between the outer pipe 310 and the inner pipe 320 of the mold 300. In some examples, the vibrator is employed to mix the cement slurry 330 within the mold 300. Herein, the vibrator is configured to purge entrapped air inside the cement slurry 330. In some examples, prior to cement preparation, the mold 300 may be first prepared by greasing the outer surface 310a of the outer pipe 310 and tightening the outer pipe 310 and the inner pipe 320 together by using flanges and flange caps. In some embodiments, the method 600 further comprises adding cement additives to the cement slurry 330. The cement additives are at least one additive selected from a group consisting of accelerators, retarders, dispersants, extenders, weighting agents, gels, foamers, and fluid loss additives. In an embodiment, the cement slurry further comprises a pozzolan selected from the group consisting of fly ash, calcined clay, silica fume, rice husk ash, pumice, and shale. In an embodiment, the cement is Portland cement, low heat cement, or blast furnace slag cement. In an embodiment, in addition to the vibrator, a defoamer is added to the cement slurry to further help air bubbles from forming during mixing. Herein, the mold 300 allows the cement slurry 330 to set and take the shape and dimensions complementary to the cylindrical pressure vessel 110, for the formed cured concrete pipe sheath 400 to be paced therein.

At step 604, the method 600 includes curing the cement slurry to form the cured concrete pipe sheath (sample). Herein, the mold 300 may be placed inside an oven at a desired temperature to cure the cement slurry 330. In the present implementations, the curing time of the cement slurry 330 is at least 12 hours, preferably at least 16 hours, preferably at least 20 hours, or at least 24 hours. In an embodiment, the curing takes places at a temperature from 100° C. to 500° C., preferably from 200° C. to 400° C., or 300° C. In an embodiment, the curing takes place at pressures ranging from 100 psi to 600 psi, preferably from 200 psi to 500 psi, preferably from 300 psi to 400 psi, or 350 psi. Once the curing is achieved, the mold 300 is removed from the oven, and the outer pipe 310 is taken off. It may be understood that for intact samples, the inner pipe 320 may not be loosened, and the cured concrete pipe sheath 400 along with the inner pipe 320 may be placed in the cylindrical pressure vessel 110, to examine its permeability/sealability using the testing pressure vessel 100 of the present disclosure.

In one or more embodiments, the microfilm 340 is placed on the outer surface 320a of the inner pipe 320 of the mold 300 at a predetermined thickness to define the microannulus 410 in the cured concrete pipe sheath 400. The microfilm 340 is wrapped on the outer surface 320a of the inner pipe 320 of the mold 300 several times, depending on the required thickness of the microannulus 410. Then, the cement slurry 330 is poured into the mold 300, and post that the mold 300 may be placed in the oven at a desired temperature for curing the cement slurry 330 into the cured concrete pipe sheath 400 during step 604. Herein, the cured concrete pipe sheath 400 with or without the microannulus 410 is removed from the mold 300.

At step 606, the method 600 includes evaluating the sealability of the cured concrete pipe sheath 400 (sample) under different compressive flange loads in the testing pressure vessel 100. Sealability can be measured according to ASTM F37-06(2019), ASTM F2378, or ASTM F2029, preferably F37-06(2019). In an embodiment, the inhibition efficiency is measured according to ASTM F37-06(2019), where the user uses a small-diameter narrow-width gasket with the test cement specimen under relatively low gasket loads and relatively low pressures to determine leakage rates/sealability. During testing, the confining pressure is gradually applied on the cured concrete pipe sheath 400 by providing the pressurized fluid from the syringe 170 to the hydraulic inlet 164. Once the confining pressure reaches about 300 psi, the injection pressure is applied to the cured concrete pipe sheath 400 by supplying the inert gas (i.e., the sample injection fluid) at a low pressure to the sample injection port 140 of the cylindrical pressure vessel 110. The sample injection fluid may enter the cured concrete pipe sheath 400 from top via the sample injection port 140 in the top cap 116, or bottom via the outlet port 144 in the bottom cap 118, to mimic fluid migration through cement sheath at constant pressure or constant flow rate. The top cap 116 and the bottom cap 118 have the respective porous frits 152, 156 to allow uniform distribution of the sample injection fluid across the whole annular area. The sample injection fluid is controlled by the pump 176 which can provide a constant flow rate ranging from 0.00025 to 80 cc/min and may also provide a constant pressure up to 6000 psi. The sample injection fluid is collected at the effluent circuit, where the effluent circuit has the BPR 160 to control the pore pressure of the cured concrete pipe sheath 400. Herein, the PBR 160 may be activated by injecting gas into it via the gas source 184 and the pump 186, to keep a desired pressure differential across the cured concrete pipe sheath 400. In an embodiment, the gas is nitrogen or helium. The confining pressure is then raised gradually, keeping a 300 psi difference between the confining pressure and injection pressure, until the desired injection pressure is achieved. Then, the injection pressure may be left for couple of hours (or as required) to test whether the cured concrete pipe sheath 400 is able to prevent the gas migration or not. It may be understood that the gas may migrate to the effluent if the cured concrete pipe sheath 400 fails to prevent gas invasion. If gas is produced at the effluent, the permeability of the cured concrete pipe sheath 400 is measured using the pressure transducers 174. It may be appreciated that the cylindrical pressure vessel 110 has three pressure ports 166 to mount the pressure transducers 174 to measure the pressure drop across a length of the sample of the cured concrete pipe sheath 400. Based on the permeability value, a new cement slurry may be mixed with different concentration of the same additives used to prepare the first sample with the cement slurry 330 (or may be prepared with different additives), and the testing may be repeated for such samples until a cement composition for the cement slurry 330 imparting desired properties to the cured concrete pipe sheath 400 is found.

Figure 7:
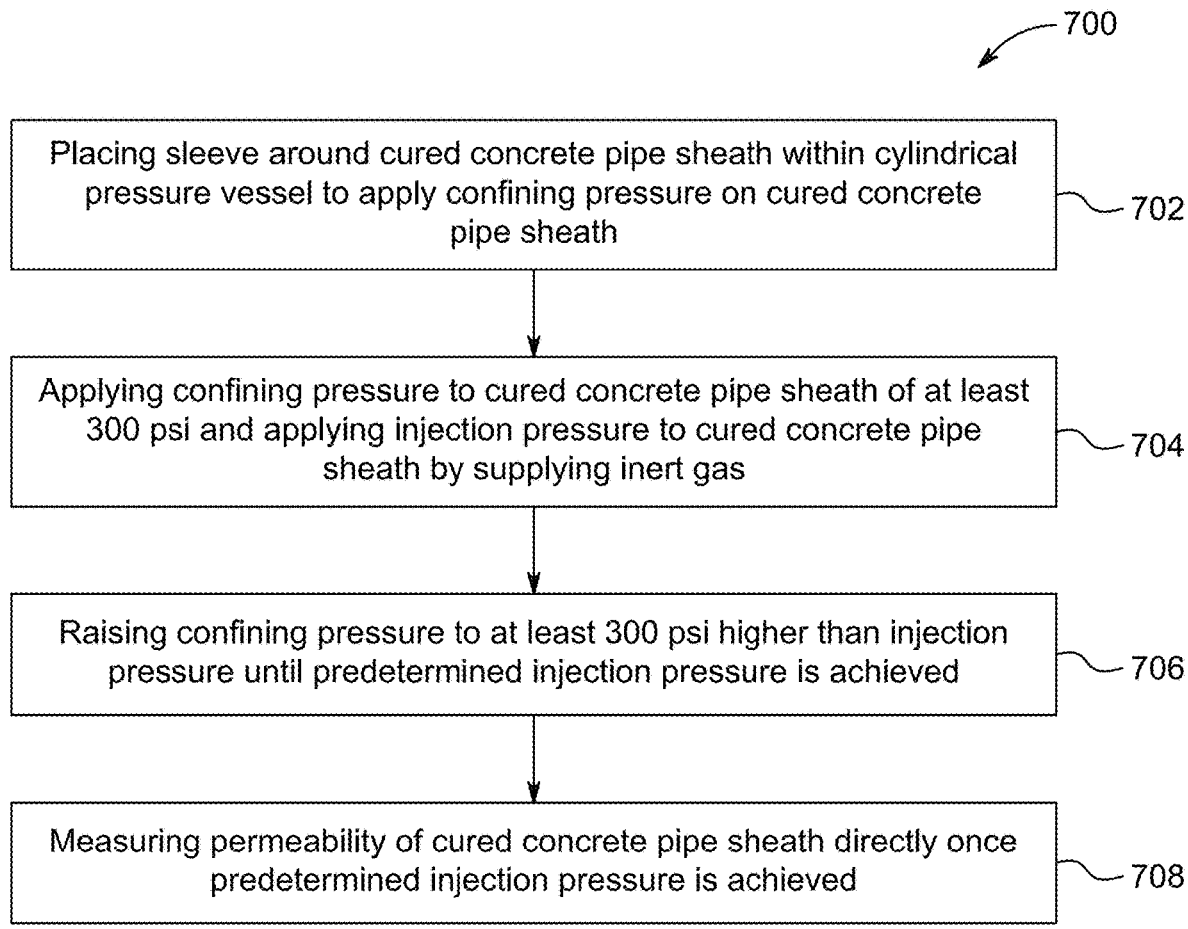
FIG. 7 is an exemplary flowchart of a method to test cured concrete pipe sheathes using the testing pressure vessel, according to certain embodiments.

Referring to FIG. 7, illustrated is the exemplary flowchart of the method (represented by reference numeral 700) to test cured concrete pipe sheathes (such as, the cured concrete pipe sheath 400) using the testing pressure vessel 100. The various teachings as discussed in the preceding paragraphs with respect to the description of the testing pressure vessel 100 and the method 600 apply mutatis mutandis to the method 700 of the present disclosure.

At step 702, the method 700 includes placing the sleeve 162 around the cured concrete pipe sheath 400 (sample)

within the cylindrical pressure vessel 110 to apply the confining pressure on the cured concrete pipe sheath 400. Herein, the cured concrete pipe sheath 400 is placed inside the cylindrical pressure vessel 110 with the sleeve 162 tightly placed around the outer surface 400a thereof. The sleeve 162 being made of rubber may compress to be tightly placed around the outer surface 400a of cured concrete pipe sheath 400.

At step 704, the method 700 includes applying the confining pressure to the cured concrete pipe sheath 400 (sample) of at least 300 psi and applying the injection pressure to the cured concrete pipe sheath 400 by supplying the inert gas. In some embodiments, the confining pressure is from 300 psi to 700 psi, preferably from 400 psi to 600 psi, or 500 psi. Herein, during testing, the confining pressure is gradually applied on the cured concrete pipe sheath 400 by providing the pressurized fluid from the syringe 170 to the hydraulic inlet 164. In the present examples, the inert gas is nitrogen or helium. In an alternative embodiment, the inert gas is xenon or argon. In an embodiment, the inert gas is supplied by the BPR 160. In an embodiment, an air flow meter is employed to monitor the flow rate of the inert gas supplied.

At step 706, the method 700 includes raising the confining pressure to at least 300 psi higher than the injection pressure until a predetermined injection pressure is achieved. Herein, once the confining pressure reaches about 300 psi, the injection pressure is applied to the cured concrete pipe sheath 400 by supplying the inert gas (i.e., the sample injection fluid) at a low pressure to the sample injection port 140 of the cylindrical pressure vessel 110. In an embodiment, the confining pressure is raised by supplying a larger volume of pressurized fluid through the hydraulic inlet 164. In an embodiment, the pressurized fluid is supplied through the hydraulic inlet 164 at a pressure ranging from 10 psi to 150 psi, preferably from 50 psi to 100 psi, or 75 psi. In an embodiment, the inert gas is supplied at a pressure ranging from 10 psi to 50 psi, preferably 20 psi to 40 psi, or 30 psi. The confining pressure is then raised gradually, keeping a 300 psi difference between the confining pressure and injection pressure, until the desired injection pressure is achieved.

At step 708, the method 700 includes measuring a permeability of the cured concrete pipe sheath 400 (sample) directly once the predetermined injection pressure is achieved. Herein, the injection pressure may be left for a couple of hours (or as required) to test whether the cured concrete pipe sheath 400 is able to prevent the gas migration or not. It may be understood that the gas may migrate to the effluent if the cured concrete pipe sheath 400 fails to prevent gas invasion. If gas is produced at the effluent, the permeability of the cured concrete pipe sheath 400 is measured using the pressure transducers 174. It may be appreciated that the cylindrical pressure vessel 110 has three pressure ports 166 to mount the pressure transducers 174 to measure the pressure drop across a length of the sample of the cured concrete pipe sheath 400. Permeability can be measured according to ASTM C642, ASTM C1202, or ASTM C1012, preferably ASTM C642. In an embodiment, the permeability is measured directly according to ASTM C642, where the user dries the concrete sample to constant mass in an oven, immerses it in water until it reaches a constant mass, boils it in water for 5 hours, weighs it again, and determines the absorption. Based on the permeability value, a new cement slurry may be mixed with different concentration of the same additives used to prepare the first sample with the cement slurry 330 (or may be prepared with different additives), and the testing may be repeated for such samples until a cement composition for the cement slurry 330 imparting desired properties to the cured concrete pipe sheath 400 is found.

In one or more embodiments, the method 700 further includes determining the gas flow rate of the effluent (i.e., the sample injection fluid) running through the cylindrical pressure vessel 110 with the gas flow meter 182. As may be contemplated, the measured gas flow rate of the effluent provides a base value for measuring the permeability of the cured concrete pipe sheath 400. Further, the method 700 includes mounting the pressure transducers 174 to the outer surface 112a of the cylindrical pressure vessel 110 (at the pressure ports 166) before applying the confining pressure, so that the pressure transducers 174 may be able to measure the pressure drop across the cured concrete pipe sheath 400.

The testing pressure vessel 100 of the present disclosure may be utilized to test the sealability/permeability of the cement sheath 400 after hardening under high pressure and high temperature conditions, such as in oilwells. The testing pressure vessel 100 is configured to mimic secondary gas migration through annular cement and cement flaws. The testing set-up 102 of the testing pressure vessel 100 may help in testing any type of cement including, but not limited to, Portland, expandable, geopolymer, etc. In addition, the cement formulated with several additives may also be examined in the testing pressure vessel 100 to investigate the ability of formulated cement slurry to seal annular space at elevated pressures and temperatures. The testing pressure vessel 100 may allow to test the cement sheath 400 at temperatures up to 350° C. and pressure up to 6000 psi. The testing pressure vessel 100 of the present disclosure may be configured to examine the sealability of the cement sheath 400 and allows the measurement of important parameters such as leakage time, cement permeability, and microannulus permeability of the cement sheath 400. It may be appreciated that data generated from the testing pressure vessel 100 may be used to develop software to assess the risk associated with the design of an oil well or the like.

Numerous modifications and variations of the present disclosure are possible in light of the above teachings. It is therefore to be understood that within the scope of the appended claims, the invention may be practiced otherwise than as specifically described herein.

The invention claimed is:

1. A testing apparatus for permeability testing of a cured concrete sample, comprising:
   a cylindrical pressure vessel having a top cap and a bottom cap, wherein:
   the bottom cap has a first mating surface configured to contact a ring-shaped surface of a bottom face of the cylindrical pressure vessel and accommodate an O-ring to seal the bottom cap to the bottom face of the cylindrical pressure vessel,
   the top cap has a second mating surface configured to contact a ring-shaped surface of a top face of the cylindrical pressure vessel and accommodate an O-ring to seal the top cap to the top face of the cylindrical pressure vessel,
   the top cap has a sample injection port passing from an outer surface of the top cap to an inner surface of the top cap and a casing fluid injection port passing from the outer surface of the top cap to the inner surface of the top cap,
   the casing fluid injection port is axially aligned with the cylindrical pressure vessel,
   the sample injection port is offset from axial alignment with the cylindrical pressure vessel to fluidly connect the sample injection port at an upper annular space within an enclosed space of the cylindrical pressure vessel, the bottom cap has a casing fluid outlet port passing from an inner surface of the bottom cap to an outer surface of the bottom cap and an outlet port passing from the outer surface of the bottom cap to the inner surface of the bottom cap, the top cap has a top cylindrical protrusion having a diameter less than a diameter of the top cap and configured to inset into the enclosed space of the cylindrical pressure vessel forming the upper annular space between an outer cylindrical surface of the top cylindrical protrusion and an inner surface of the cylindrical pressure vessel, and the bottom cap has a bottom cylindrical protrusion having a diameter less than a diameter of the bottom cap and configured to inset into the enclosed space of the cylindrical pressure vessel forming a lower annular space between an outer cylindrical surface of the bottom cylindrical protrusion and the inner surface of the cylindrical pressure vessel;

a hydraulic inlet passing from an outer surface of the cylindrical pressure vessel to an outer surface of a sleeve, wherein the sleeve is positioned adjacent to the inner surface of the cylindrical pressure vessel and the hydraulic inlet; and a plurality of pressure ports mounted proximal to the sleeve to measure a pressure exerted on the sleeve.

2. The testing apparatus of claim 1, wherein the top cap has a porous frit configured to allow uniform distribution of each of an injected casing fluid passing through the casing fluid injection port and a sample injection fluid passing through the sample injection port to the cylindrical pressure vessel.

3. The testing apparatus of claim 1, wherein the bottom cap has a porous frit configured to allow uniform distribution of each of an injected casing fluid passing through the casing fluid injection port and a sample injection fluid passing through the sample injection port to the cylindrical pressure vessel.

4. The testing apparatus of claim 1, wherein the outlet port further comprises a back-pressure regulator (BPR) positioned between an inner surface of the bottom cap and the outer surface of the bottom cap.

5. The testing apparatus of claim 1, wherein the sleeve is fabricated of rubber.

6. The testing apparatus of claim 1, wherein the hydraulic inlet further comprises a syringe.

7. The testing apparatus of claim 6, wherein the syringe accommodates a confining pressure of from 5000 pounds per square inch (psi) to 6000 psi.

8. The testing apparatus of claim 1, wherein a sample injection fluid passing through the sample injection port is collected with a container positioned by the outlet port at the outer surface of the bottom cap.

9. The testing apparatus of claim 1, wherein the sample injection port is configured to accommodate a flow of a sample injection fluid in a range from 0.00025 to 80 cubic centimeters per minute (cc/min).

10. The testing apparatus of claim 1, wherein the plurality of pressure ports is at least 3.

11. The testing apparatus of claim 1, wherein an individual pressure port of the plurality of pressure ports is separated from a neighboring pressure port by a distance of from 15-30% of a total length of the cylindrical pressure vessel.

12. A method for evaluating a sealability of the cured concrete sample with the testing apparatus of claim 1, comprising:

preparing a cement slurry with cement and a vibrator within a mold, wherein the vibrator is configured to purge entrapped air inside the cement slurry;

curing the cement slurry to form the cured concrete sample; and evaluating the cured concrete sample under different compressive flange loads in the testing apparatus to determine the sealability of the cured concrete sample.

13. The method of claim 12, wherein a microfilm is placed on an outer surface of an inner pipe of the mold at a predetermined thickness to define a microannulus in the cured concrete sample.

14. The method of claim 13, wherein the cured concrete sample with or without the microannulus is removed from the mold.

15. The method of claim 12, wherein the method further comprises adding cement additives to the cement slurry.

16. The method of claim 15, wherein the cement additives are at least one additive selected from a group consisting of accelerators, retarders, dispersants, extenders, weighting agents, gels, foamers, and fluid loss additives.

17. A method to test cured concrete samples using the testing apparatus of claim 1, comprising:

placing the sleeve around the cured concrete sample within the cylindrical pressure vessel to apply a confining pressure on the cured concrete sample;

applying the confining pressure to the cured concrete sample of at least 300 psi and applying an injection pressure to the cured concrete sample by supplying an inert gas;

raising the confining pressure to at least 300 psi higher than the injection pressure until a predetermined injection pressure is achieved; and measuring a permeability of the cured concrete sample directly once the predetermined injection pressure is achieved.

18. The method of claim 17, wherein the method further comprises determining a gas flow rate of an effluent running through the cylindrical pressure vessel with a gas flow meter.

19. The method of claim 17, wherein the inert gas is nitrogen or helium.

20. The method of claim 17, wherein the method further comprises mounting pressure transducers to the outer surface of the cylindrical pressure vessel before applying the confining pressure.

* * * * *